June 30, 1964

L. A. LUKE

DIGITAL DATA COMPARATOR UTILIZING MAJORITY-DECISION LOGIC CIRCUITS

Filed Aug. 2, 1961

3,139,523

INVENTOR

LOUZELLE A. LUKE

United States Patent Office 3,139,523
Patented June 30, 1964

3,139,523
DIGITAL DATA COMPARATOR UTILIZING MAJORITY-DECISION LOGIC CIRCUITS

Louzelle A. Luke, Coon Rapids, Minn., assignor to Sperry Rand Corporation, New York, N.Y., a corporation of Delaware Filed Aug. 2, 1961, Ser. No. 128,879
7 Claims. (Cl. 235—177)

This invention relates to digital data processing circuits and more particularly to circuits for comparing sets of binary data.

In apparatus for processing binary data, it is often necessary to compare sets of binary information to determine their relative magnitudes. In general, the results of the comparison are utilized to activate the next sequential series of steps in the data processing. Since the comparison is a bookkeeping type of operation, the amount of time consumed by this step should be kept to a minimum so that the data can be processed at the greatest speed. In adding two sets of binary information together, determination of carries for each stage resulting from the addition of the sets of information must also be performed at high speeds in order to obtain the greatest efficiency in the operation of the data processing equipment.

In most present day data processing apparatus circuits for performing the functions described above and others of a similar nature consist of a large number of interconnected logic circuits of the well-known AND–OR variety in order to effect rapid operation of these functions. In addition to the complexity of the circuitry, these circuits utilize a large number of components, many of which wastefully consume power. In the instant invention majority-decision logic circuits are utilized to compare two sets of binary information. The simplified circuit of the instant inventon performs the comparison at a very rapid rate with a fewer number of components and less power consumption.

Therefore, it is an object of this invention to provide a new and improved circuit for comparison of binary information.

Another object of this invention is to provide a high-speed comparison circuit for binary information of relative simplicity and low power consumption.

In one embodiment of this invention two sets of binary information are each stored in separate registers each having corresponding digit order stages. A three-input majority-decision logic circuit for each pair of corresponding digit order stages receives a signal representation of the binary value of one stage of the first register and a signal representation of the complement of the binary value in the corresponding digit order stage in the other register. Each of the majority-decision logic circuits includes means for combining these two inputs to develop an output signal of a first value when both of the inputs are of a first binary value and of a second level when at least one of the inputs is of a second binary value. This provides a digit-by-digit comparison of the contents of the two storage registers.

The output of each of the majority-decision logic circuits is coupled as a third input to the next higher digit order majority-decision logic circuit and each of said logic circuits further includes means for combining this third input signal with the first two input signals for developing an output signal of said first value when two of the three inputs are of a first binary value and an output signal of a second level when two of the three input signals are of the second binary value. In this manner the results of the digit-by-digit comparison are combined stage-by-stage so that the output signal developed by the highest digit order majority-decision logic circuit indicates that the contents of one of the registers is either greater than or equal to the contents of the other register or is less than the contents of the other register.

In another embodiment of this invention, a second series of majority-decision logic circuits similar to the one previously described is utilized with opposite inputs each of the first two inputs from the respectively corresponding digit order register stages, that is, the binary value of one stage of the second register provides a first input to the corresponding digit order majority-decision logic element and the complement of the binary value of the corresponding digit order stage of the first register provides the second input. The same comparison as described above is performed by the second series of majority-decision logic circuits. However, the output of the highest digit order majority-decision logic circuit in this instance indicates if the contents of the second register is of greater magnitude or equal to the contents of the first register. Utilization of two sets of majority-decision logic circuits thereby provides means for determining whether there is equality of register contents or if one is greater than the other.

In a third embodiment of this invention, a single series of three-input majority-decision logic circuits, one for each pair of corresponding digit order stages, is utilized to determine the carries developed during the addition of binary information stored in two registers. The binary value of each of the corresponding digit-order register stages is coupled to respective ones of the majority-decision logic circuits and the output of each logic circuit is coupled to the next higher digit order majority-decision logic circuit. The output of each of the logic circuits determines whether or not a carry has been developed in the corresponding digit order either as a result of both register stages being a binary "1" or at least one of said stages being a binary "1" and the occurrence of a carry developed by the next lower digit order.

Therefore, it is another object of this invention to provide an improved circuit for comparison of binary information to determine the relative magnitudes.

Still a further object of this invention is to provide a new and improved carry tree circuit for a binary adder.

These and other more detailed and specific objects will be disclosed in the course of the following specification, reference being had to the accompanying drawings, in which.

Figure 1:
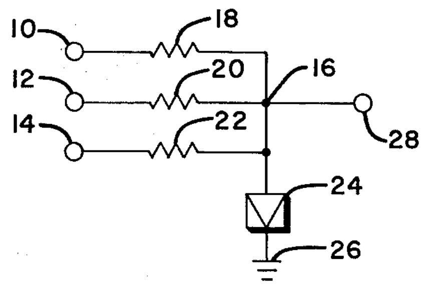
FIG. 1 is the schematic diagram of a typical majority-decision logic circuit utilizable in this invention.

The majority-decision logic circuit is distinguishable from the well-known AND-OR logic circuits which are commonly used to perform logic operations on binary information by the fact that it will output a signal representative of a binary value in accordance with and in response to the majority of the input binary signals. In the well-known AND circuit a signal representative of a binary "1" will be outputed by the circuit only if all of the input signals are representative of binary "1's" and the well-known OR circuit will output a signal representative of a binary "1" if any of the input signals are representative of binary "1's." In the majority-decision logic circuit a signal representative of a binary "1" will be outputed if a majority of the input signals are representative of binary "1's." For example, assuming a three-input majority-decision logic circuit, the output signal will be a signal representative of a binary "1" only if at least two of the input signals are binary "1's." FIG. 1 shows the schematic of a typical three-input majority-decision logic circuit and includes three input terminals, 10, 12 and 14, a common junction 16, resistors 18, 20 and 22 for coupling each of the input terminals 10, 12 and 14, respectively to the common junction 16, a tunnel diode 24 coupling the common junction to a reference potential 26 shown as ground and an output terminal 28 connected to the common junction.

Figure 2:
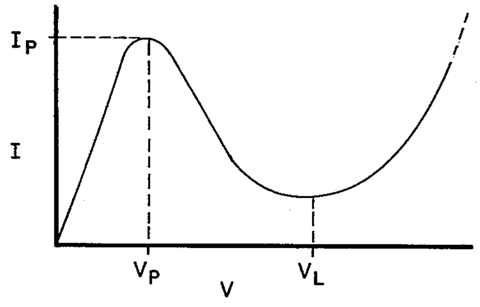
FIG. 2 is a typical current-voltage characteristic curve for a tunnel diode utilizable in the circuit of FIG. 1.

FIG. 2 shows the well-known current-voltage characteristic curve for a typical tunnel diode utilizable in the circuit of FIG. 1. It should be understood that this characteristic curve is not intended to be to scale but is shown only for purposes of illustration. As is well-known in the art, current applied to the tunnel diode in the forward conducting direction of a magnitude greater than the peak current, $I_p$, will cause the tunnel diode to switch its operating point from the relatively low potential area to the left of $V_p$, to the higher-potential, lower-current area in the valley of the characteristic curve. It can be seen that the resistance values for resistors 18, 20 and 22 based upon the signal potentials applied to their corresponding input terminals 10, 12 and 14 can be determined such that sufficient current will be applied to the tunnel diode 24 of a magnitude exceeding the peak current $I_p$ to switch it to the high-voltage, low-current operating area corresponding to $V_L$ only if a majority (at least two) of the input signals to the input terminals are of sufficient potential level. When the current applied to the tunnel diode from the signals applied to the input terminals is less than the peak current $I_p$, the tunnel diode will operate in its low-voltage area so that the potential drop across the diode will be less than $V_p$. In the latter case, the tunnel diode sets the output terminal 28 to a potential level less than $V_p$ whereas if the applied current is of a magnitude greater than $I_p$ the potential drop across the tunnel diode will set the potential at the output terminal 28 essentially to $V_L$.

For purposes of explanation, with no limitation intended, assume the signals applied respectively to terminals 10, 12 and 14 from a source not shown are of a first potential level, $V_1$, corresponding to a binary "1" and of a lower potential, $V_2$, corresponding to a binary "0." Again solely for the purposes of explanation, assume both of these potential levels, $V_1$ and $V_2$, are such as to supply current to the tunnel diode in the forward conduction direction. Furthermore, assume that the majority-decision logic circuit of FIG. 1 outputs a potential level of $V_L$, representing a binary "1," and outputs a potential level less than $V_p$, representative of a binary "0" on the output terminal 28. The resistance values for the three resistors shown, 18, 20 and 22, are determined so that only when at least two of the input signals applied to the three-input terminals are of potential $V_1$, representing binary "1's," will current exceeding $I_p$ be applied to the tunnel diode 24 in the forward conduction direction so as to drive it to its operating point on the characteristic curve corresponding to $V_L$. In other words, the resistance value, R, of each of the resistors would be such that $$2I_p > \frac{(X+1)V_1}{2R} > I_p \text{ and } \frac{XV_2}{R} < I_p$$

In the manner described above, the majority-decision logic element develops an output signal representing a binary value in response to and in accordance with the binary value signal representations of the majority of the input signals thereto. It should be recognized that the binary value representing signals applied to the input terminals need not vary between the same potential levels since each of the resistor values can be individually determined depending upon the potential levels of the input signal applied to its corresponding input terminal, taking into account, of course, the tunnel diode characteristics.

Figure 3:
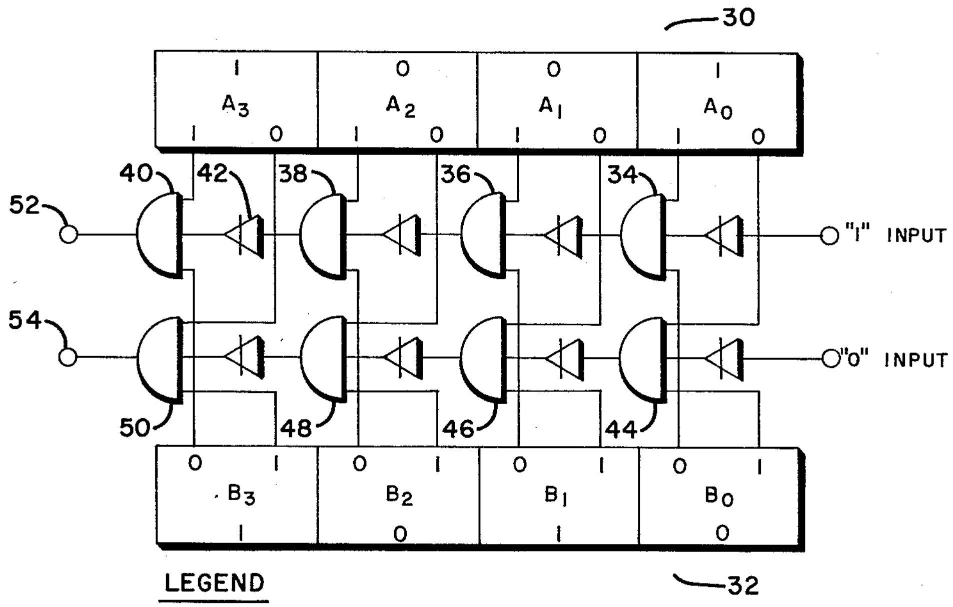
FIG. 3 is a block diagram of one embodiment of this invention and includes the description of the symbols used in the figures.
Figure 3:
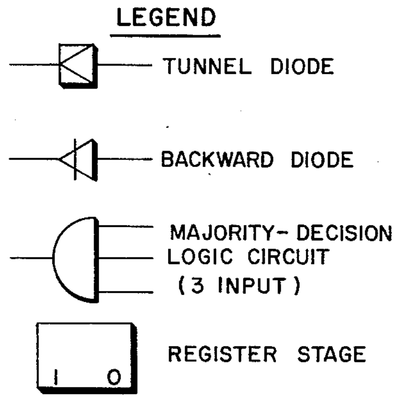

The embodiment of this invention shown in FIG. 3 includes two four-stage binary storage registers 30 and 32 respectively comprising stages $A_0$–$A_3$ and $B_0$–$B_3$ of corresponding increasing digit order. Circuits for each of the register stages are well-known in the art, for example, bistable transistorized flip-flops having complementary and normal outputs indicated respectively in FIG. 3 by 0 and 1 in each of the register stages. When a given register stage is in the "1" state, its normal or 1 output is a signal representative of a binary "1" and the complementary or 0 output is a signal representative of a binary "0." When the stage is in the "0" state, the complementary output will be a signal representative of a "1" and the normal output will be a signal representative of a binary "0." As shown by the legend in FIG. 3, the majority-decision logic circuits are represented by half-moon symbols with the inputs thereto at the flat side and the output at the semicircular side. Two sets of majority-decision logic circuits are shown, one comprising logic circuits 34–40 and the other comprising logic circuits 44–50. There is one majority-decision logic circuit in each set for each pair of corresponding digit order stages in the two registers 30 and 32. For example, majority-decision logic circuit 34 in one of the sets corresponds to the lowest order digit pair of stages in registers 30 and 32, $A_0$ and $B_0$ respectively, and majority-decision logic circuit 44 in the other set of logic circuits likewise corresponds to the same lowest digit order pair of stages in the two registers. Majority-decision logic circuit 40 in the first set and majority-decision logic circuit 50 in the second set correspond to the highest digit order stages of the registers 30 and 32, $A_3$ and $B_3$ respectively. Each of the majority-decision logic circuits in both sets have two inputs coupled to the corresponding digit order stage in the two registers 30 and 32 and each, exclusive of the lowest digit order majority-decision logic circuits, has a third input coupled to the output of the next lowest digit order majority-decision logic circuit via unidirectional conducting means shown as a backward diode such as 42. For example, the highest digit order majority-decision logic circuit 40 has a first input from the normal or 1 output of $A_3$ which is signal representation of the binary value contained in stage $A_3$ of register 30 and has a second input from the complementary output of $B_3$ which is a signal representation of the complement of the binary value contained in stage $B_3$ of register 32. The third input to majority-decision logic circuit 40 is the output from the next lowest digit order majority-decision logic circuit 38 via backward diode 42. The third input to the majority-decision logic circuits in each of the sets corresponding to the lowest digit order of stages of the registers is provided by a source of signal representations of binary "1's," not shown.

The operation of the circuit of FIG. 3 can best be explained by assuming binary data stored in each of the two registers 30 and 32. Assume the binary word 1001 is stored in register 30 in stages $A_3$–$A_0$ respectively, and the binary word 1010 stored in register 32 in stages $B_3$–$B_0$ respectively. Considering the first set of majority-decision logic circuits, comprising logic circuits 34, 36, 38 and 40 corresponding respectively to the lowest digit order of stages of the registers and successively higher digit order stages, each of the logic circuits compares the stored words digit-by-digit by the two inputs to each of the majority-decision logic circuits from the corresponding pair of digit order stages. The lowest digit order majority-decision logic circuit 34 has a first input signal representative of a binary "1" from the normal output of register stage $A_0$ and a second input of a signal representative of a binary "1" from the complementary output of register stage $B_0$. As previously described, since at least two of the three inputs to majority-decision logic circuit 34 are signals representative of a binary "1," it develops an output signal representative of a binary "1." Majority-decision logic circuit 36 compares the binary values stored in register stages $A_1$ and $B_1$ via inputs from said register stages, both of which are signal representations of binary "0's." Therefore, the result of the bit-by-bit comparison performed by majority-decision logic circuit 36 will provide an output therefrom of a binary "0." Still considering, of course, only the two inputs from the corresponding digit order stages of the registers 30 and 32, the digit-by-digit comparison performed by majority-decision logic circuits 38 and 40 will result in output signals from each representative of binary "0's" since only one of the input signals to each of these two latter majority-decision logic circuits is a binary "1." The result of the digit-by-digit comparison performed by each of the majority-decision logic circuits on the corresponding digit order pair of register stages is transmitted via backward diodes to the third input of the next higher digit order majority-decision logic circuit. Although the output signal from majority-decision logic circuit 34 is a signal representation of a binary "1," resulting from the comparison of a $A_0$ and $B_0$, sinces the two inputs from the corresponding digit order register stages $A_1$ and $B_1$ to majority logic circuit 36 are both "0's," the third input will be ineffective to change the output signal of majority-decision logic circuit 36. A majority of the input signals of majority-decision logic circuit 36 being representative of binary "0's," the output therefrom which is transmitted to the next higher digit order majority-decision logic circuit 38 will be a signal representative of a binary "0." Majority-decision logic circuit 38 combines this third input with the signal representations of binary "1" and "0" respectively from stages $A_2$ and $B_2$ to develop an output signal corresponding to the majority of the binary-valued input signal representations, in this case being binary "0's." The output signal from majority-decision logic circuit 38 is coupled as the third input to majority-decision logic circuit 40 and being a signal representative of a binary "0" results in a majority of the input signals to majority-decision logic circuit 40 being representative of binary "0" so that the output signal therefrom is representative of a binary "0." This latter output signal at terminal 52, which is coupled to the output of majority-decision logic circuit 40, indicates that the data stored in register 30 is less than the data stored in binary register 32.

The foregoing describes the comparison beginning with the lowest digit order stages and continuing up through the highest digit order stages in order to describe the propagation of the results of the digit-by-digit comparison from one stage to the next higher digit order. It is obvious that the comparison is actually performed in reverse order, i.e., beginning with the highest digit order stages and continuing toward the next successive lower digit order stages since if comparison of any higher digit order stages results in a signal output representative of a binary "1," the results of comparison of lower digit order stages is meaningless.

Considering now the second set of majority-decision logic circuits 44–50, it is seen that the comparison performed by the second set of logic circuits is performed simultaneously with the comparison by the first set of logic circuits in the same manner as described above except that the two inputs from the corresponding digit order pair of register stages are representative of the opposite states of said registers. For example, the lowest digit order majority-decision logic circuit of the first set, 34, receives inputs from the normal output of register stage $A_0$ and the complement output of register stage $B_0$. The corresponding lowest digit order majority-decision logic circuit in the second set, 44, receives an input from the complement output of register stage $A_0$ and the normal output of register stage $B_0$. Without repeating in detail, since the operation is similar to that of the first set of majority-decision logic circuits described above, it can be seen that the digit-by-digit comparison performed by the majority-decision logic circuits 44–50 in the second set will develop output signals respectively representing binary values 0 1 0 0. The signal representation of binary "1" outputed by majority-decision logic circuit 46 and coupled to the third input of majority-decision logic circuit 48 will be combined by the latter with the two inputs thereto from the corresponding digit order stages of the registers 30 and 32, $A_2$ and $B_2$ respectively to develop a resulting output signal representing a binary "1" since two of the three inputs thereto are signals representative of binary "1's." Likewise, majority-decision logic circuit 50 combines the signal representative of a binary "1" outputed from majority-decision logic circuit 48 with the two input signals from register stages $A_3$ and $B_3$ which are respectively signals representative of binary "0" and binary "1" and develops a resulting output signal representative of a binary "1" since a majority of the input signals thereto are representative of a binary "1." The signal appearing on terminal 54 which is coupled to the output of majority-decision logic circuit being a binary "1" indicates that the data stored in register 32 is of greater magnitude than or equal to the data stored in register 30. It is obvious, of course, that if the output signals from the highest digit order majority-decision logic circuits 40 and 50 which appear respectively on terminals 52 and 54 were both signals representative of binary "0's," then the indication would be that the contents of register 30 is of the same magnitude as the contents of register 32.

It should be recognized that in the event that the only criteria resulting from the comparison of the binary data is whether the contents of one stage is greater than the contents of the other register, only a single set of majority-decision logic circuits described above is required.

The foregoing has described embodiments of this invention utilizable as comparator circuits for determining the relative magnitudes between two sets of binary information. A so-called carry-tree circuit for use in parallel addition of two sets of binary information requires only a single set of majority-decision logic circuits, one logic circuit for each pair of corresponding digit order register stages. Two of the inputs to each of the logic circuits are the normal outputs from the respectively corresponding digit order stages and the third input to all of the logic circuits except the lowest digit order logic circuit is coupled via a diode from the next lower digit order majority-decision logic circuit. The third input to the lowest digit order majority-decision logic circuit is from a source of signal representations of binary "0." When the contents of corresponding digit order stages in the two registers are both binary "1's," the corresponding majority-decision logic circuits develop an output signal representative of a binary "1" to indicate that the addition of those two digits will result in the development of a carry. If both of the corresponding digit order stages are binary "0's," the corresponding majority-decision logic circuit outputs a signal representative of a binary "0" indicating no carry developed. If only one of the corresponding digit order stages of the two registers is a binary "1" whether or not a carry is developed in that stage depends upon whether or not a carry has been developed by the next lower digit order stage. For example, utilizing the same exemplary contents of the two registers of the binary words 1001 and 1010, it can be seen that the digit-by-digit comparison of the corresponding three lowest order digits will result in detecting that no carries are developed by their digit-by-digit parallel additions since no more than a single binary "1" appears at the input to the corresponding majority-decision logic circuits. However, since both of the highest digit order stages of the two registers are binary "1's," two of the inputs to the highest digit order majority-decision logic circuits are signal representations of binary "1's" which are combined in said logic circuit to develop an output signal therefrom representative of a binary "1" to indicate the generation of a carry resulting from the addition of those two digits.

It is understood that suitable modifications may be made in the structure as disclosed provided such modifications come within the spirit and scope of the appended claims. Having now, therefore, fully illustrated and described my invention, what I claim to be new and desire to protect by Letters Patent is:

1. For comparing binary-coded data stored in two binary registers each having an equal number of corresponding digit order stages: a majority-decision logic circuit for each pair of register stages of corresponding digit order for developing an output signal in response to and in accordance with a majority of binary value input signal representations; means for applying signal representations of the binary value contained in each digit order stage of one of said registers to an input of the respectively corresponding majority-decision logic circuit; means for applying signal representations of the complement of the binary value contained in each digit order stage of the other of said registers to another input of the respectively corresponding majority-decision logic circuit; and unidirectional conducting means for applying the output signal from each of said majority-decision logic circuits to still another input of the next higher digit order majority-decision logic circuit.

2. For comparing two sets of binary information each of an equal number of corresponding digit orders: a three-input majority-decision logic circuit for each digit order of the information to be compared; means for applying signal representations of the complementary binary value of the respective digit orders of one of said sets of information and the non-complementary binary value of the respective digit orders of the other of said sets of information to the inputs of the respectively corresponding majority-decision logic circuits whereby said logic circuits compare said sets of information digit-by-digit; each of said logic circuits including means for developing an output signal of a first binary value when both of said two input signals are of said first binary value and for developing an output signal of a second binary value when either of said two input signals are of said second binary value; unidirectional conducting means for applying the output signals resulting from said digit-by-digit comparison from each of said logic circuits to the third input of the next higher digit order logic circuit; each of said logic circuits further including means for combining said third input signal with said two input signals for developing an output signal of said first binary value when any two of said three input signals are of said first binary value.

3. For comparing binary-coded data stored in two binary registers of an equal number of corresponding digit order stages: a three-input majority-decision logic circuit for each digit order of the information to be compared; means for coupling signal representations of the binary value of each stage of one of said registers to a first input of a different one of said majority-decision logic circuits; means for coupling signal representations of the complement of the binary value of each stage of the other of said registers to a second input of said corresponding digit order majority-decision logic circuit; each of said logic circuits including means for developing an output signal representing a first binary value when both of said first and second input signals are of said first binary value and for developing an output signal representing a second binary value when either of said first or second inputs are of said second binary value whereby said majority-decision logic circuits compare said data digit-by-digit; unidirectional conducting means for coupling said output signals resulting from said digit-by-digit comparison from each of said logic circuits to the third input of the next higher digit order majority-decision logic circuit; each of said logic circuits further including means for combining said third input signal with said first and second input signals and for developing an output signal in response to said combined signals of said first binary value when any two of said first, second and third input signals are of said first binary value, the output signal of said highest digit order majority-decision logic circuit representative of said first binary value when said binary information in said first register is of at least equal in magnitude to that of said other register.

4. For comparing binary data stored in two binary registers each of an equal number of corresponding digit order stages: a majority-decision logic circuit for each pair of corresponding digit order stages of said registers, each of said logic circuits comprising three input terminals, linear impedance means electrically coupling each of said input terminals to a common junction, a tunnel diode electrically coupling said junction to a reference energy level and an output terminal connected to said junction, the characteristics of said tunnel diode and the resistance values of said resistors being such that said tunnel diode sets said output terminal to an energy level representative of a binary "1" only if at least two of said input terminals are set to energy levels representative of binary "1"; means for coupling energy levels representative of the binary value of each stage of one of said registers to a first input of the corresponding majority-decision logic circuit; means for coupling an energy level representative of the complement of the binary value stored in each stage of the other of said registers to the second input of the corresponding digit order majority-decision logic circuit; unidirectional conducting means coupling the third input of each of said logic circuits to the output terminal of the next lower digit order majority-decision logic circuit; means for coupling a third input of the lowest order majority-decision logic circuit to an energy level representative of binary "1"; the energy level at the output terminal of the highest digit order majority-decision logic circuit being at a level representative of a binary "1" only when the contents of said one register is of a magnitude equal to or greater than the contents of said other register.

5. Apparatus for comparing the magnitude of binary-coded data comprising: first and second binary data storage registers each including a plurality of bistable stages for storing binary data in corresponding digit orders; first and second sets of three-input majority-decision logic circuits, one of said logic circuits in each set for each pair of corresponding digit order stages of said registers; means for coupling signal representations of the complementary and normal binary value of each of said stages in said first register respectively to a first input of corresponding digit order majority-decision logic circuits in said first and second sets; means for coupling signal representations of the normal and complementary binary values of each stage of said second register respectively to a second input of corresponding digit order majority-decision logic circuits in said first and second sets; means for coupling a third input of each of said majority-decision logic circuits to the next lower digit order majority-decision logic circuit in the same set; each of said majority-decision logic circuits including means for developing an output signal in response to and in accordance with a majority of the input signal binary value representations, the output signal developed by the highest digit order majority-decision logic circuit in said first set being of a first predetermined value in response to the input signals thereto when said first register data is at least of magnitude equal to said second register data and the output signal developed by the highest digit order majority-decision logic circuit in said second set being of said first predetermined value in response to the input signals thereto when said second register data is at least of magnitude equal to said first register data.

6. For comparing binary-coded data stored in two binary registers each of an equal number of corresponding digit order stages: a first and second set of three-input majority-decision logic circuits, each of said sets including one of said logic circuits for each digit order of the information to be compared; means for coupling signal representations of the binary value of each stage of one of said registers to a first input of a different one of said logic circuits in said first set; means for coupling signal representations of the complement of the binary value of each stage of the other of said registers to a second input of said corresponding digit order majority-decision logic circuit in said first set; means for coupling signal representations of the complement of the binary value of each stage of said one register to a first input of a different one of said majority-decision logic circuits in said second set; means for coupling signal representations of the binary value of each stage of the other of said registers to a second input of said corresponding digit order majority-decision logic circuit in said second set; each of said logic circuits including means for developing an output signal representative of a first binary value when both of said first and second input signals are of said first binary value and for developing an output signal representative of a second binary value when either of said first or second input signals are of said second binary value whereby said majority-decision logic circuits in each of said first and second sets compare said stored data digit-by-digit; unidirectional conducting means for coupling said output signals resulting from said digit-by-digit comparisons from each of said logic circuits in each of said first and second sets to the third input of the next higher digit order majority-decision logic circuit in the same set; each of said logic circuits further including means for combining said third input signal with said first and second input signals and for developing an output signal in response to said combined signals of said first binary value only when at least two of said three input signals are of said first binary value; the output signal of the highest digit order majority-decision logic circuit in said first set representative of said first binary value when said binary data in said first register is of magnitude equal to or greater than that stored in said other register and the output signal of the highest digit order majority-decision logic circuit of said second set representative of said first binary value when said binary data in said other register is of magnitude equal to or greater than that stored in said first register.

7. Apparatus as in claim 6 wherein said output signal developing means in said majority-decision logic circuits comprise three parallel signal input circuits for coupling input signals to a common junction and a tunnel diode for coupling said common junction to a reference potential, said tunnel diode developing said output signal at said junction in response to and in accordance with a majority of the binary value input signal representations.

References Cited in the file of this patent

UNITED STATES PATENTS 2,999,637 Curry ---------------- Sept. 12, 1961